United States Patent
Morrill

[15] 3,697,842
[45] Oct. 10, 1972

[54] HIGH STARTING TORQUE ECCENTRIC WINDING SHADED POLE MOTOR

[72] Inventor: Wayne J. Morrill, 3448 S. Washington Road, Fort Wayne, Ind. 46804

[22] Filed: May 20, 1971

[21] Appl. No.: 145,401

[52] U.S. Cl. ............318/221 R, 318/223, 318/225 R, 319/172
[51] Int. Cl. .............................................H02p 1/44
[58] Field of Search .......310/172; 318/200 R, 221 R, 318/222, 223, 225 R

[56] References Cited

UNITED STATES PATENTS

| | | | |
|---|---|---|---|
| 2,266,088 | 12/1941 | Shea | 318/233 UX |
| 2,705,770 | 4/1955 | Suhr | 318/223 X |
| 3,158,769 | 11/1964 | Morrill | 310/172 |

*Primary Examiner*—Gene Z. Rubinson
*Attorney*—Hood, Gust, Irish, Lundy & Coffey

[57] ABSTRACT

A single phase, shaded pole, alternating current induction motor which includes a stator core member having at least one pair of pole piece assemblies. Each pole piece assembly comprises first and second portions, the first portion having a shading coil thereon on the side thereof remote from the second portion which forms shaded and unshaded sections of the first pole piece portion. A first coil embraces each pole piece assembly and a second coil embraces the first portion only of each pole piece assembly. The first coils are connected in series to form a first winding and the second coils are also connected in series to form a second winding, the first and second windings being connected in series. A speed-responsive switch is provided having first and second positions, the switch in its first position coupling the first winding for energization across a single phase, alternating current source for starting the motor. The switch is actuated to its second position in response to a predetermined motor speed in which both the first and second windings are serially coupled for energization across the source. The coils on each of the pole pieces are arranged so that upon energization of both the windings the unshaded pole piece sections respectively have greater magnetomotive force therein than the second pole piece portions.

8 Claims, 3 Drawing Figures

PATENTED OCT 10 1972 3,697,842

INVENTOR:
WAYNE J. MORRILL
BY, Hood, Gust, Irish,
Lundy & Coffey
ATTORNEYS

HIGH STARTING TORQUE ECCENTRIC WINDING SHADED POLE MOTOR

BACKGROUND OF THE INVENTION

FIELD OF THE INVENTION

This invention relates generally to single phase, shaded pole, alternating current motors, and more particularly to a shaded pole motor of the eccentric winding type.

Conventional shaded pole alternating current motors incorporate salient poles, each pole having a field coil thereon and a shading coil embracing a part of one pole tip and providing a lagging flux component, thereby providing a rotating field for starting the motor. A conventional shaded pole motor incorporating salient poles characteristically has a pronounced harmonic dip in its speed torque characteristic by reason of large odd harmonics of space distribution in the stator flux wave. In some conventional shaded pole motors, the dip in the speed torque curve, typically occurring at about one-third synchronous speed and caused by the third harmonic, is sufficiently severe that the motor, under certain load conditions, will accelerate to only about one-third synchronous speed but will not have sufficient torque to accelerate to its normal running speed. The adverse effects of harmonic dips have been reduced in the past by the use of a relatively high resistance rotor but at the sacrifice of motor output and efficiency.

In my U.S. Pat. No. 3,158,769, granted Nov. 24, 1964, there is shown and described an eccentric winding shaded pole motor wherein the large odd harmonics in the stator flux wave was greatly reduced, thus reducing the detrimental harmonic torque dips and, in turn, permitting the use of a lower resistance rotor with consequent improvement in motor output and efficiency. In the construction of my aforesaid prior patent, each pole piece comprises first and second portions, the shading coil being disposed on the first portion remote from the second portion and forming shaded and unshaded sections of the first pole piece portion. A first coil embraces the entire pole piece, i.e., both the first and second portions, and a second coil embraces the first portion only, the two coils on each pole piece being connected in series. With this eccentric winding arrangement, the motor has a smooth acceleration torque curve essentially free from large harmonic dips and a high running efficiency due to the elimination of most of the harmonic torques at operating speed, and also due to the lower resistance rotor which may be employed.

All conventional shaded pole motors, including the eccentric winding motor of my aforesaid patent, have relatively low starting torque, thus generally limiting their use to low starting torque applications, such as in air moving. The economical shaded pole motor construction could be used in a much wider variety of applications if its starting torque could be increased.

SUMMARY OF THE INVENTION

I have found that the starting torque of a shaded pole motor incorporating the eccentric winding construction of my aforesaid patent can be increased by several orders of magnitude by connecting all of the long pitch coils, i.e., the coils which embrace the entire pole piece, in series to form one winding, and also connecting all of the short pitch coils, i.e., the coils which embrace only the first portion of each pole piece, in series to form a second winding. The first winding alone, which comprises the serially connected long pitch coils, is energized during starting of the motor. After the motor has reached a predetermined speed, the second winding, which comprises the serially connected short pitch coils, is automatically serially connected with the first winding for energization. The long pitch coils are distributed full pitch on the stator core in the same manner as the coils of a conventional shaded pole motor and thus, more starting torque will be provided for the same excitation than is provided with the eccentric winding distribution of my aforesaid patent. Further, since there are fewer turns in the long pitch coils than in the total eccentric winding, the motor is subjected to more excitation during starting than in the entire winding were energized thus further increasing the starting torque. When the motor has accelerated to a suitable speed, speed-responsive switching means connects the short pitch coils in the circuit thus providing the entire eccentric winding arrangement of my aforesaid patent, thereby providing the increased output and efficiency of that motor during normal running operation.

The invention, in its broader aspects, provides a starting circuit for a single phase, shaded pole, alternating current motor which includes a stator core member having at least one pair of pole pieces. Each of the pole pieces has first and second portions with shading coil means on a section of the first portion remote from the second portion which forms shaded and unshaded sections of the first portion. A first coil embraces the entire pole piece and a second coil embraces the first portion only of the pole piece. The starting circuit comprises first means for coupling the first coils to form a first winding and second means for coupling the second coils to form a second winding. Switching means is provided having first and second positions for coupling, in the first position thereof, the first winding only for energization by a single phase, alternating current source for starting the motor, and for coupling, in the second position thereof, both the windings for energization by the source following the starting of the motor, the coils on each of the pole pieces being connected and arranged so that upon energization of both of the windings, the unshaded pole piece sections respectively have greater magnetomotive force therein than the second pole piece portions.

It is accordingly an object of the invention to provide an improved shaded pole motor.

Another object of the invention is to provide an improved shaded pole motor having increased starting torque.

A further object of the invention is to provide an eccentric winding shaded pole motor having increased starting torque.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENTS

Figure 1:
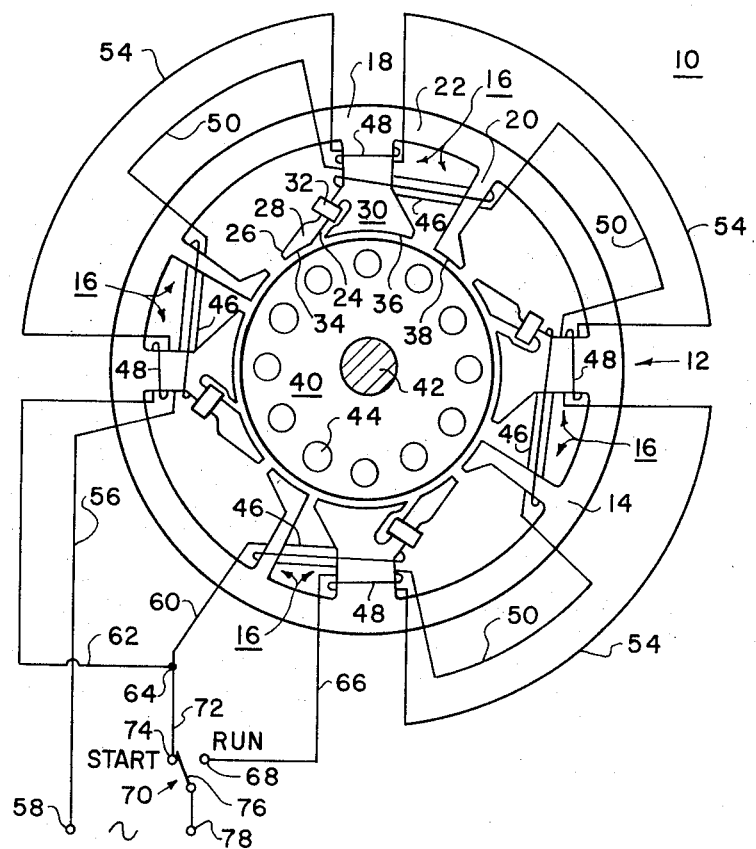
FIG. 1 is a schematic illustration of the improved eccentric winding motor of the invention.

Referring now to FIG. 1, there is shown, generally indicated at 10, a four pole, shaded pole induction motor embodying the eccentric winding construction of my aforesaid U.S. Pat. No. 3,158,769 and incorporating the improved starting circuit of the present invention. Motor 10 comprises stator core 12 formed of a stacked plurality of relatively thin laminations of magnetic material, stator core 12 including yoke portion 14 and four pole piece assemblies 16. Each of the pole piece assemblies 16 comprises a first salient portion 18 and a second salient portion 20 defining slot 12 therebetween.

Each pole piece portion 18 has a slot 24 therein dividing portion 18 into sections 28, 30. Shading coil 32 extends through slot 24 and embraces section 28, section 28 thus being a shaded section and section 30 an unshaded section. Sections 28, 30 of pole piece portion 18 and pole piece portion 20 respectively have faces 34, 36 and 38 which define a bore for rotatably receiving squirrel cage rotor 40, pole faces 34, 36 and 38 respectively forming equallength air gaps with the peripheral surface of rotor 40. Rotor 40 mounted on shaft 42 comprises a core also formed of a stacked plurality of relatively thin laminations of magnetic material and a winding comprising squirrel cage bars 44 connected at the opposite ends thereof by short circuiting end rings (not shown).

Each of the pole piece assemblies 16 has a first, long pitch coil 46 which embraces the entire pole piece assembly, i.e., both portions 18 and 20. Each pole piece assembly 16 further has a second or short pitch coil 48 which embraces pole piece portion 18 only, coil 48 having a side positioned in slot 22.

The construction of motor 10 as thus far described is that shown in my aforesaid U.S. Pat. No. 3,158,769. However, in the eccentric winding motor construction shown in my aforesaid patent, the long pitch coil 46 and the short pitch coil 48 on each pole piece assembly 16 are connected in series, all of the thus serially connected short and long pitched coils being connected in series for energization across a single phase source of alternating current.

Figures 2, 3:
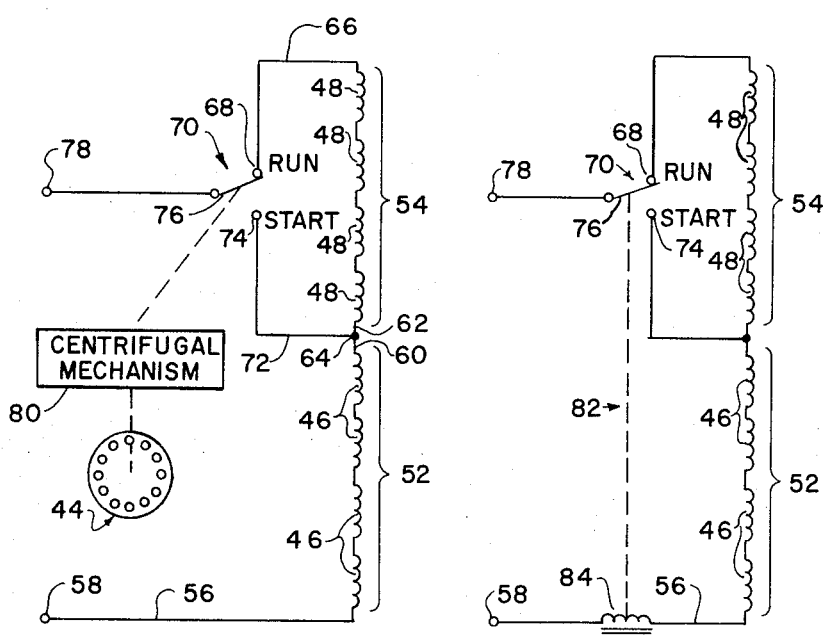
FIG. 2 schematically illustrates one form of speed-responsive switching mechanism which may be employed with the motor of FIG. 1.
FIG. 3 schematically illustrates another form of switching mechanism which may be employed with the motor of FIG. 1.

In accordance with the present invention, leads 50 serially connect the long pitch coils 46 to form a first winding 52 (FIGS. 2 and 3) and leads 54 serially connect all of the short pitch coils 48 to form a second winding 54 (FIGS. 2 and 3). End 56 of first winding 52 is directly connected to external terminal 58 and end 60 of first winding 52 is directly connected to end 62 of second winding 54, as by connection 64. It will thus be seen that first winding 52 comprising the serially connected long pitch coils 46 and the second winding 54 comprising the serially connected short pitch coils 48 are connected in series.

End 66 of second winding 54 is connected to "run" contact 68 of a single pole, double throw switch 70. Lead 72 connects connection 64 and end 60 of first winding 52 to "start" contacts 74 of switch 70. Movable switch element 76 of switch 70 is connected to the other external terminal 78, external terminals 58 and 78 being adapted to be connected across a suitable source of single phase, alternating current potential.

In accordance with the invention, during starting of the motor, switch 70 is in the "start" position thereby connecting only the first winding 52 comprising the serially connecting long pitch coils 46 for energization across external terminals 58, 78. During normal running operation, switch 70 serially couples both winding 52 and winding 54 which comprises the serially connected short pitch coils 48 for energization across external terminals 58, 78. Movable contact element 76 of switch 70 is preferably automatically actuated from its "start" position 74 to its "run" position 68 in response to the motor accelerating to a predetermined speed, preferably slightly less than one-third synchronous speed.

Referring now to FIG. 2, movable contact element 76 of switch 70 may be actuated by centrifugal switch operating mechanism 80 operatively connected to rotor 44. Referring to FIG. 3, switch 70 may form a part of a current-responsive relay 82 having its operating coil 84 serially coupled in lead 56 between external terminal 58 and winding 52. Here, with the motor de-energized, movable switch contact element 76 will be in the "run" position 68. Immediately upon energization of the motor with rotor 44 being stationary, a high inrush of starting current flows due to the locked-rotor condition which will energize operating coil 44 and actuate movable contact element 76 of switch 70 to its "start" position thereby coupling winding 52 only for energization across external terminals 58, 78 to provide the high starting torque as above-described. As the motor accelerates, the current flowing in winding 52 falls and at a predetermined lower level of current corresponding to the desired motor speed, preferably slightly less than one-third synchronous speed, movable contact element 76 of switch 70 is actuated to its "run" position 68 thereby serially coupling both windings 52, 54 for energization across external terminals 58, 78.

It will be readily understood that other speed-responsive means may be employed for actuating switch 70 from its "start" to its "run" position, such as a thermal relay having a bimetallic element heated in response to the current flow winding 52 of a potential relay having its operating coil coupled across windings 52. Further, since the motor accelerates to the desired switching speed in a predictable short interval of time, a short interval timer may be employed for actuating switch 70.

It will be readily understood that the mode of operation of the motor following actuation of switch 70 to its "run" position 68 with all of the short and long switch coils serially connected for energization is as described in my aforesaid U.S. Pat. No. 3,158,769. It will be readily understood that while the invention has been shown as embodied in a four pole motor, it is equally applicable to motors having a less or greater number of poles, such as a two pole or a six pole motor.

In a specific four pole, four watt, shaded pole motor having the stator construction and coil arrangement shown in FIG. 1 and in my aforesaid patent, a starting torque of 3.5 ounce inches was provided with all of the short and long pitch coils at all times serially connected for energization, as described in my aforesaid patent. The same motor embodying the starting circuit of the invention, i.e., with only the long pitch coils 46 serially coupled for energization across the source at starting, provided a starting torque of 20 ounce inches.

While there have been described above the principles of this invention in connection with specific apparatus, it is to be clearly understood that this description is made only by way of example and not as a limitation to the scope of the invention.

What is claimed is:

1. In a single phase, shaded pole, alternating current motor including a stator core member having at least one pair of pole pieces; each of said pole pieces having first and second portions, shading coil means on a section of said first portion remote from said second portion for forming shaded and unshaded sections of said first portion, a first coil embracing the entire pole piece, and a second coil embracing said first portion only; a starting circuit comprising first means for coupling said first coils to form a first winding, second means for coupling said second coils to form a second winding, and switching means having first and second positions for coupling in said first position thereof said first winding only for energization by a single phase, alternating current source for starting said motor, and for coupling in said second position thereof both of said windings for energization by said source following starting of said motor, said coils on each of said pole pieces being connected and arranged so that upon energization of both of said windings said unshaded pole piece sections respectively have greater magnetomotive force therein than said second pole piece portions.

2. The starting circuit of claim 1 wherein said first means couples said first coils in series and second means couples said second coils in series.

3. The starting circuit of claim 2 wherein said switching means in said second position thereof couples said first and second windings in series across said source.

4. The starting circuit of claim 1 wherein said switching means includes means for actuating the same from said first to said second position thereof in response to a predetermined speed of said motor.

5. The starting circuit of claim 4 wherein said actuating means comprises a speed-responsive mechanism.

6. The starting circuit of claim 4 wherein said actuating means comprises a relay having an operating coil coupled in circuit with said first winding.

7. The starting circuit of claim 4 wherein said actuating means is responsive to the current flowing in said first winding.

8. The starting circuit of claim 1 wherein said first means couples said first coils in series and said second means couples said second coils in series, said first and second windings being coupled in series, said switching means comprising a single pole, double throw switch coupling said first winding only across said source in said first position thereof and coupling said first and second windings in series across said source in said second position thereof, said switching means including means for automatically actuating said switch from said first to said second position thereof in response to a predetermined starting characteristic of said motor.

* * * * *